Jan. 26, 1954  E. M. KANE  2,667,142
SHOCK INDICATING DEVICE
Filed July 8, 1952  2 Sheets-Sheet 1

INVENTOR
ERNEST M. KANE.
BY
ATTORNEY

Jan. 26, 1954   E. M. KANE   2,667,142
SHOCK INDICATING DEVICE
Filed July 8, 1952   2 Sheets-Sheet 2

INVENTOR
ERNEST M. KANE
BY
ATTORNEY

Patented Jan. 26, 1954

2,667,142

UNITED STATES PATENT OFFICE 2,667,142

SHOCK INDICATING DEVICE

Ernest M. Kane, Oxnard, Calif.

Application July 8, 1952, Serial No. 297,792

10 Claims. (Cl. 116—114)

(Granted under Title 35, U. S. Code (1952), sec. 266)

The invention described herein may be manufactured and used by or for the Government of the United States of America for governmental purposes without the payment of any royalties thereon or therefor.

This invention relates to shock indicating devices, and is particularly concerned with devices of this type for attachment to an article or object to be transported to indicate whether the article has been subjected en route to mechanical shocks sufficient to damage its internal parts or contents.

This application is a continuation-in-part of co-pending U. S. application Serial No. 286,591 of Ernest M. Kane, filed May 7, 1952.

Shock gauges or shock indicators are known. However, prior art devices of this type have not proven entirely satisfactory for various reasons. For example, one commercial instrument measures shocks along only one axis. Moreover, it must be adjusted accurately in order to be correctly read, it must be read with a magnifying glass, it is not sensitive to shocks of short duration and it requires in its construction an element made of spring steel, a scarce and critical material.

One object of this invention is to provide a shock indicating device which indicates shock in different directions or along a plurality of axes.

Another object is to afford a shock indicator capable of responding to shocks of short duration.

Another object is the provision of a simple, sensitive, inexpensive shock indicating device constructed of readily available materials and easily attachable to an object or article to be transported, which device indicates at a glance whether the article to which it is attached has been subjected to any undesirable shocks, or shocks beyond a certain magnitude, and also the probable direction thereof.

Other objects and many of the attendant advantages of this invention will be readily appreciated as the same becomes better understood by reference to the following detailed description when considered in connection with the accompanying drawings wherein.

The shock indicating device of the invention comprises chiefly a shock-sensitive element having a plurality of frangible extensions arranged along more than one geometrical axis, said extensions being weighted to facilitate fracture thereof. In the preferred embodiments of the invention the shock-sensitive element includes a central body portion having radial extensions in the form of frangible arms attached thereto and arranged along a plurality of axes. These arms are each preferably provided with a constricted section, which in such instances is the most sensitive portion of the arm and hence most susceptible to breakage or fracture when the device is subjected to shock. To aid fracture of the frangible extensions or arms of the invention device under the influence of shock, these arms are weighted or loaded near their ends, usually by means of a metallic member. Such metallic members may be retained in holes or apertures in said arms or may be supported in some other manner thereon. The shock-sensitive element is generally at least partially enclosed in a transparent protective shield to prevent breakage and fracture of the arms by causes other than mechanical shock, and the entire assembly is adapted for attachment by means of a suitable fastener to an article to be shipped.

The invention device may be attached to any article which it is desired to transport or move, and is particularly designed to be fixed to an object having fragile contents or to a device having sensitive parts, e. g. rocket motors, electronic devices or component parts of guided missiles, immediately after packaging or assembling of the article and prior to shipment. After shipment to its destination or at any intermediate point during shipment, the invention indicator may be inspected to ascertain whether the article has been dropped or otherwise jarred sufficiently to damage it internally. This makes it possible to fix responsibility for any damage which has occurred to the article, and to prevent accidents which may occur if a damaged article, e. g. an electronic device or a component part of a guided missile, were to be used.

Figure 2:
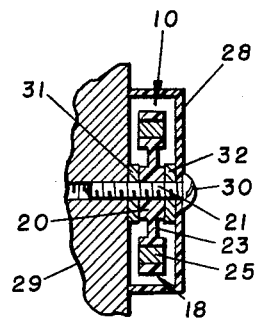
Fig. 2 is a cross-sectional view taken on line 2—2 of Fig. 1.
Figure 1:
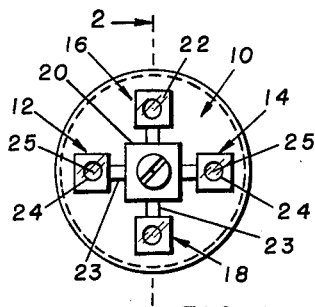
Fig. 1 is a front view of one embodiment of the device.

According to a preferred embodiment of the invention shown in Figs. 1 and 2 of the drawings, a shock-sensitive element 10 has four arms 12, 14, 16 and 18 radially extending from a central body portion or hub 20 having a centrally positioned circular hole 21 therein. Each of the four arms is located in the same plane, the arms being spaced at equal intervals around the hub so that arms 12 and 14 are in line directly opposite each other, and similarly for arms 16 and 18, which are perpendicular to arms 12 and 14. Hence, one pair of arms 12 and 14 may be considered as extending along the X or horizontal axis, and the other pair 16 and 18 along the Y or vertical axis. All of the arms have a constricted section 23 connecting the arm with the central body portion 20. The constricted sections are both narrower and thinner than the outer portions 22 of each arm. It is substantially at these constricted sections that fracture or breakage of the arms takes place, due to shock to which the device is subjected.

Each of the arms 12, 14, 16 and 18 has a hole or aperture 24 in its outer portion beyond the constricted section 23. A metallic insert 25 having the same circular contour as the apertures is forced into each of the apertures 24 and held securely therein. The metal inserts serve to weight the arms and cause fracture thereof at constricted sections 23 under the influence of lighter shocks than would be the case where the arms are not weighted in the manner indicated. Hence, the loading or weighting feature of the invention particularly provides a more sensitive shock indicating device than is afforded in its absence. By varying the size of the aperture 24 and the metallic insert contained therein, the shock indicator of this invention may be made more or less sensitive.

The shock sensitive element 10 including the arms thereof may be constructed most advantageously of a plastic material either of a thermoplastic or thermosetting nature, the thermoplastic substances being preferred. Examples of thermoplastics which may be employed are acrylic, styrene and vinyl resins; Bakelite (phenol-formaldehyde resin) is a typical suitable thermosetting material. Any metal may be employed for weighting purposes in accordance with the invention. The term "metal" or "metallic insert" as employed herein is intended to denote alloys or mixtures of metals, as well as pure metals. Preferably a relatively heavy metal or alloy is utilized such as iron, steel, lead or brass. It is apparent that the metallic weighting feature of the invention enables the use of shock sensitive element 10 in the readily molded aforementioned plastic form, whereas in the absence of this feature it is usually necessary to construct such element from a brittle type of material such as glass or porcelain, as set forth in the above noted parent application, in order to obtain the desired shock sensitiveness or fracturability of the arms of the element.

A transparent protective shield 28 is positioned in relation to shock-sensitive element 10 so as to enclose the front and sides of the element, and the entire assembly is then rigidly attached to an article or object 29 to be transported, by means of a screw 30 passing through the center of the shield and hole 21 of element 10. A washer 31 is interposed between the surface of article 29 and the central body portion 20 of element 10, and a second washer 32 is positioned between said body portion and the inside surface of the shield, to prevent contact of the frangible arms of the shock-sensitive element with either the article or the shield, and to maintain the element rigidly in position between the shield and object 29.

The invention device may be secured to the article to be moved or transported with arms 12 and 14 extending along the horizontal axis, and arms 16 and 18 along the vertical axis, as seen in Fig. 1, to determine shocks along these axes. However, if desired, the device of Fig. 1 may be mounted so that the arms are at oblique angles to the horizontal or vertical.

Figure 3:
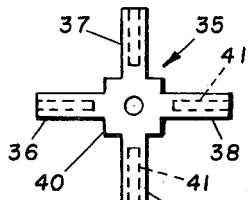
Fig. 3 is a front view of another embodiment of the invention device.
Figure 4:
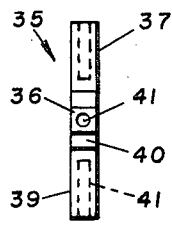
Fig. 4 is a side view of the device of Fig. 3.

Figs. 3 and 4 show a modification of the shock-sensitive element of Figs. 1 and 2. In this modification the element 35 is provided with four arms 36, 37, 38 and 39 in the same plane and spaced at equal intervals around a central body portion 40. These arms have the same cross sectional area throughout their length and each of the arms has a hollow portion 41 extending from the end of the arm a substantial distance along its length, such hollow portions being filled with a suitable metallic material for weighting the arms in accordance with the invention.

Figure 5:
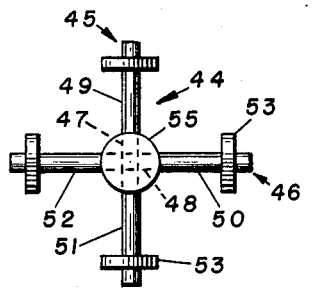
Fig. 5 is a front view of still another embodiment of the invention device.
Figure 6:
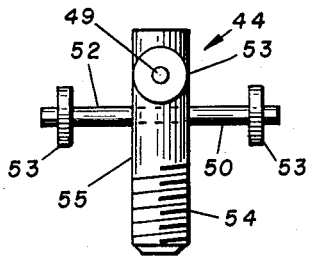
Fig. 6 is a plan view of the device of Fig. 5.

In still another embodiment of the invention, as shown in Figs. 5 and 6, a shock sensitive element 44 is provided by passing two rods 45 and 46 through suitable holes 47 and 48, respectively, in a central hub member 55, these holes being perpendicular to, and offset from, each other, thus forming four arms 49, 50, 51 and 52, equally spaced around hub member 55. Attached by suitable means (not shown) near the ends of each of the arms for weighting purposes according to the invention principles, is a disc or slug of metal 53. Hub member 55 is elongated and contains screw threads 54 at one end thereof for attachment to an article to be shipped. This embodiment, as well as the other modifications of the shock sensitive element of the invention described herein, may be utilized under conditions where a protective shield, such as shield 28 in Fig. 2, may not be necessary. In the device of Figs. 5 and 6 the radial arms are shown to have a circular cross-section, as this facilitates mounting on the central hub. Thus, the arms have equal strengths along the various axes. If it is desired that the arms have different strengths along different axes, they can be notched to a rectangular cross-section at a point adjacent the hub.

Figure 7:
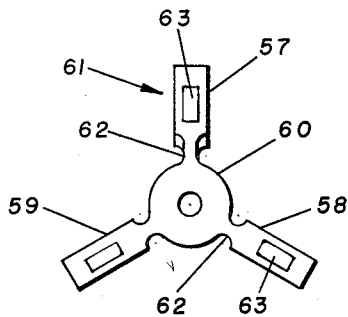
Fig. 7 is a front view of still another embodiment of the invention device.
Figure 8:
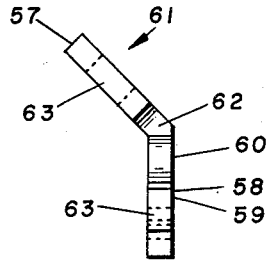
Fig. 8 is a side view of the embodiment of Fig. 7.

Any number of radially extending arms may be attached to the central body portion or hub of the shock-sensitive element of the invention device, and these arms may be positioned along any desired axis and in one or more planes. Thus, for example, the embodiment shown in Figs. 7 and 8 of the drawing comprises three arms 57, 58 and 59 equally spaced about hub 60 of the shock-sensitive element 61, arm 57 being in one plane and arms 58 and 59 being in another plane. These arms extend along three different axes diverging from hub 60, each arm having a constricted section 62 closely adjacent its point of attachment with the hub, and containing a rectangular metal insert 63 in its outer portion beyond the constriction.

Figure 9:
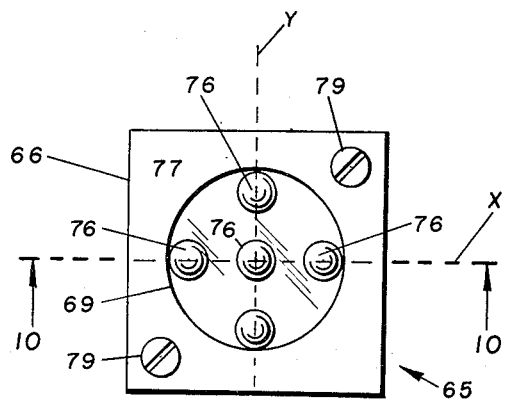
Fig. 9 is a front view of yet another modification of the invention.
Figure 10:
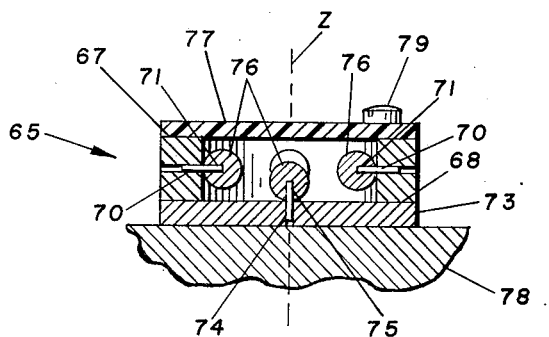
Fig. 10 is a cross sectional view taken on line 10—10 of Fig. 9.

In another modification of the invention device as shown in Figs. 9 and 10, shock-sensitive element 65 is in the form of a rectangular frame 66 having parallel front and rear faces 67 and

68, respectively, and a large circular aperture 69 centrally positioned in the frame. Four frangible rods 70 are each inserted at one end into the frame, e. g. by means of screw threads, along the periphery of, and within, the circular aperture 67; the free ends 71 of each of the rods extending into the aperture. The rods are equally spaced about the aperture with their axes in a single plane parallel to, and about midway between, faces 67 and 68 of the frame, two of the rods being positioned along the X axis and the other two along the Y axis of the frame, as indicated in Fig. 9.

A base member 73 is attached to the rear face 68 of the frame, and a fifth frangible rod 74 is inserted at one end into the center of the base member in the manner above indicated, the axis of such rod being perpendicular to the axis of rods 70 and the free end 75 of this rod extending into the frame aperture 67. Rod 74 is accordingly positioned along the Z axis of the frame, as indicated in Fig. 10, with its free end 75 extending into the frame aperture 67 normal to the free ends 71 of rods 70. A metallic weight 76 is positioned or suspended on end 71 of each of rods 70 and on end 75 of rod 74. A transparent protective plastic shield 77 is placed over the front face 67 of element 65, and the entire assembly is fastened to the surface of an object 78 to be transported, by means of screws 79. It is apparent that the device of Figs. 9 and 10 will indicate shocks along all three axes X, Y and Z.

As previously pointed out, shock-sensitive elements 35 and 61, as well as 10, are preferably constructed of a plastic, most desirably a thermoplastic, material such as an acrylic resin. In the embodiment of Figs. 5 and 6, element 44, including hub member 55 thereof, may be plastic, or arms 49, 50, 51 and 52 of the element may be plastic and hub member 55 may be metallic. With respect to the modifications shown in Figs. 9 and 10, frame 66 of shock-sensitive element 65 may be constructed of metal, wood or plastic such as Bakelite or an acrylic resin, while the rods 70 and 74 are preferably made of a thermoplastic material.

In the shock-indicating device of the invention, when the thickness of the extensions or arms, and their respective constricted sections, if any, are substantially the same, and the amount of weighting material employed for each of the arms is the same, as indicated in the various individual embodiments of the drawings, the shock rating of the device (magnitude of shock at which fracture occurs) is uniform along the different axes. Such shock ratings may be made to vary for different axes, if desired, by varying the thickness or dimensions of the arms and/or their respective constrictions, as well as by varying the size or mass of the metallic weighting elements employed.

The shock-sensitive or breakable element and its transparent protective shield, if utilized, may be secured to an object in various ways other than those indicated in Figs. 2, 6 and 10. Moreover, in certain instances, if desired, the invention device may be secured to an article in a cavity or on an irregular surface thereof.

In employing the shock indicator of the invention, the manufacturer of an article or object to be shipped mounts the indicator on the article, e. g. by means of a bolt, cap screw, wood screw or other suitable fastening means. The shock indicating device remains attached until the article reaches its destination, or if it is to be used at a number of different locations, the indicator may remain permanently attached. To read the indicator, it is necessary only to inspect it and observe whether any of the arms have been fractured or broken.

From the foregoing, it is seen that the invention device constitutes a simply constructed, inexpensive shock indicator readily assembled and attached to an article to be shipped, and which instantly indicates whether the article has been mishandled or otherwise subjected to unusual shocks during shipment, and if so, the direction thereof, so that the particular parts or contents of the article which may have been damaged may be readily located and replaced or repaired.

Obviously many modifications and variations of the present invention are possible in the light of the above teachings. It is therefore to be understood that within the scope of the appended claims the invention may be practiced otherwise than as specifically described.

I claim:

1. A shock indicating device comprising a shock-sensitive element having a plurality of frangible extensions arranged along more than one geometrical axis, said extensions being weighted to facilitate fracture thereof.

2. A shock indicating device comprising a shock-sensitive element including a body portion having a plurality of radially extending frangible arms arranged along a plurality of axes, said arms being weighted to facilitate fracture thereof.

3. A device as defined in claim 2 wherein said body portion is in the form of a central hub member having at least three said radially extending frangible arms.

4. A shock indicating device comprising a plastic shock-sensitive element including a central body portion having a plurality of radially extending arms arranged along a plurality of axes, each of said arms having a constricted frangible section and being weighted to facilitate fracture thereof.

5. A device as defined in claim 4 wherein said body portion has four said arms in the same plane, each of said arms being spaced substantially at equal intervals around said body portion and being weighted by means of a metallic membr to facilitate fracture thereof.

6. A device as defined in claim 5 wherein each of said frangible sections is closely adjacent said body portion and said metallic weighting members are carried by the outer portion of each of said arms beyond said constricted sections.

7. A shock indicating device comprising a shock-sensitive element constructed of thermoplastic material including a central body portion having four radially extending arms in the same plane and spaced substantially at equal intervals around said body portion, each of said arms having a constricted frangible section connecting said arms with said central body portion, and being apertured in its outer portion beyond said constricted section to receive a metallic insert, and metallic inserts contained in said apertures to weight said arms and facilitate fracture thereof.

8. A shock indicating device comprising a plastic shock-sensitive element including a central body portion having a plurality of radially extending frangible arms arranged along a plurality of axes, each of said arms being weighted to facilitate fracture thereof, and a transparent protective shield attached to and enclosing the front and sides of said element, said device being adapted for attachment at its back to an article to be transported.

9. In combination with an article to be transported, a shock indicating device comprising a plastic shock-sensitive element including a central body portion having a plurality of radially extending frangible arms arranged along a plurality of axes, each of said arms being weighted to facilitate fracture thereof, and a transparent protective shield at least partially enclosing said element, said device being directly attached to said article.

10. A shock indicating device comprising a shock-sensitive element constructed of thermoplastic material including a central body portion having a plurality of radially extending arms arranged along a plurality of axes, each of said arms having a constricted frangible section closely adjacent said central body portion, the outer portion of each of said arms beyond said constricted section being apertured to receive a metallic insert to facilitate fracture of said sections.

ERNEST M. KANE.

References Cited in the file of this patent

UNITED STATES PATENTS

| Number | Name | Date |
|---|---|---|
| 1,255,919 | O'Connor | Feb. 12, 1918 |
| 2,601,440 | Kerrigan | Jan. 24, 1942 |